United States Patent [19]

Gordon et al.

[11] Patent Number: 4,936,678
[45] Date of Patent: Jun. 26, 1990

[54] POSITION DETECTION SYSTEM FOR USE WITH AGRICULTURAL AND CONSTRUCTION EQUIPMENT

[75] Inventors: Gregory P. Gordon, Wooster; Robert G. Holmes, Columbus, both of Ohio

[73] Assignee: The Ohio State University, Columbus, Ohio

[21] Appl. No.: 170,788

[22] Filed: Mar. 21, 1988

[51] Int. Cl.⁵ .............................................. G01B 11/00
[52] U.S. Cl. ........................................ 356/375; 356/4; 356/152
[58] Field of Search ...................... 356/1, 4, 150, 152, 356/153, 375, 400

[56] References Cited

U.S. PATENT DOCUMENTS

| | | | |
|---|---|---|---|
| 4,268,167 | 5/1981 | Alderman | 356/1 |
| 4,277,170 | 7/1981 | Miles | 356/4 |
| 4,818,107 | 4/1989 | Ono et al. | 356/375 |
| 4,820,041 | 4/1989 | Davidson et al. | 356/152 |

FOREIGN PATENT DOCUMENTS

| | | | |
|---|---|---|---|
| 141964 | 5/1985 | European Pat. Off. | 356/1 |
| 2410254 | 7/1979 | France | 356/1 |

*Primary Examiner*—Richard A. Rosenberger
*Attorney, Agent, or Firm*—Frank H. Foster

[57] ABSTRACT

An apparatus for detecting the relative position of a remote object, such as a vehicle, upon a construction or agricultural site in cartesian, polar or other coordinates. A laser light beam is scanned in a circular path from a selected reference point at the site through a generally horizontal plane above the site. A pair of photo detectors which are spaced a selected distance are mounted to the remote object in the plane of the scanning beam. The beam is scanned at a constant velocity and the time of its alignment along a reference radial, and its interception with each of the two spaced photo detectors is detected and used to compute the position of the remote object.

9 Claims, 3 Drawing Sheets

POSITION DETECTION SYSTEM FOR USE WITH AGRICULTURAL AND CONSTRUCTION EQUIPMENT

TECHNICAL FIELD

This invention relates generally to position detection equipment and more particularly relates to an electro-optical apparatus automatically providing position location data to vehicles operating upon an agricultural field or construction site.

BACKGROUND ART

Ordinarily, in a field or planting site used for agricultural purposes and at a construction site, vehicles and other heavy equipment perform a variety of different tasks which are dependent upon the location on the field or construction site. For example, in a construction area, certain precisely defined regions may be landscaped, others may be contoured or graded, and ditches may be dug or utility lines positioned along certain defined routes. At agricultural sites tile may be laid along selected paths, and grading may be required at particular locations.

Existing systems which are capable of providing position data which could be used by such off-the-road vehicles are insufficiently accurate, require the placement of two or more reference points on or about the site, do not provide the position information to the vehicle itself where it is needed for performing the task, or are prohibitively expensive.

Prior art devices include such devices as the geodimeter which radiates a signal modulated at three or four different frequencies. The signal is reflected from a target and detection circuitry detects phase shifts in the modulated signals in order to determine distance. Such devices utilize electromagnetic energy in both the optical and microwave region of the spectrum. Satellite systems, common radar techniques and inertial position systems, similar to those used in navigational guidance systems, have also been used for position detection.

There is, however, a need for a more simple, less expensive, and more accurate system which can be easily transported to a construction or agricultural site and placed into operation with a minimum of calibration. There is also a need for a system which can conveniently provide the required electronic position coordinate data to each vehicle or other equipment operating on the surface of the site.

Such a device can provide information which can be used, for example, by agricultural equipment for controlling the application of fertilizer, chemical, or seeds at the agricultural site by varying application parameters as a function of position on the site. This would permit site soil surveys to be made, followed by the application of fertilizers, chemicals, or seeds at application rates which are tailored to the specific conditions of each location throughout the field.

For construction purposes such a system could be used for grading in accordance with a predetermined plan or topographic map or, for example, the construction of a ditch, bank, or horizontal flat or inclined space for a parking lot.

The data provided by such a system can be complemented by elevation data available by means of a laser light system currently available from Spectra-Physics of Dayton, Ohio. The Spectra-Physics system scans a laser light beam in a horizontal plane above a field. Vertically elongated detectors upon each vehicle detect the position of incidence of that light beam upon the detector. The position of electronic data representing the relative elevation of the vehicle with respect to the plane of laser light.

BRIEF DISCLOSURE OF INVENTION

The invention is an apparatus and a method for detecting the relative position of a remote object upon a geographical field. A single beam of electromagnetic energy is radiated from a selected reference point on the geographical field and scanned periodically throughout a circular path in a generally horizontal plane above the field. The rotating beam has an angular displacement with respect to a user specified reference radial extending out from the reference point. The angular displacement is a function of time and the beam is preferably rotated at a constant velocity. At least two photo detectors are mounted to each remote object and are spaced a selected distance apart. The detectors are maintained in the plane of the scanning beam and are positioned on a common axis which has a known angle to a radial intersecting that axis. They detect the time of incidence of the beam upon each detector.

The position of the remote object is detected in polar coordinates. First, the angular displacement of the beam with respect to the reference radial is detected when the beam impinges upon one of the two detectors. The distance from the reference point origin is determined by detecting a second angular displacement of the beam as it passes from incidence upon the first detector to incidence upon the second detector.

Preferably a synchronization signal is transmitted from the reference point to all vehicles in order to mark the alignment of the beam along the reference radial. Also, preferably, an alignment means cooperates with the two detectors for orienting their common detector axis perpendicularly to a radial from the reference point through the remote object in order to aim the detectors at the source of the beam.

It is an advantage of the present invention that it will provide the position data at the remote object and in its preferred embodiment, it utilizes a rotating laser light. This permits the system to be used in cooperative combination with existing elevation detection equipment which can utilize the same rotating laser light, thus making three-dimensional position data available at the vehicle.

Figure 1:
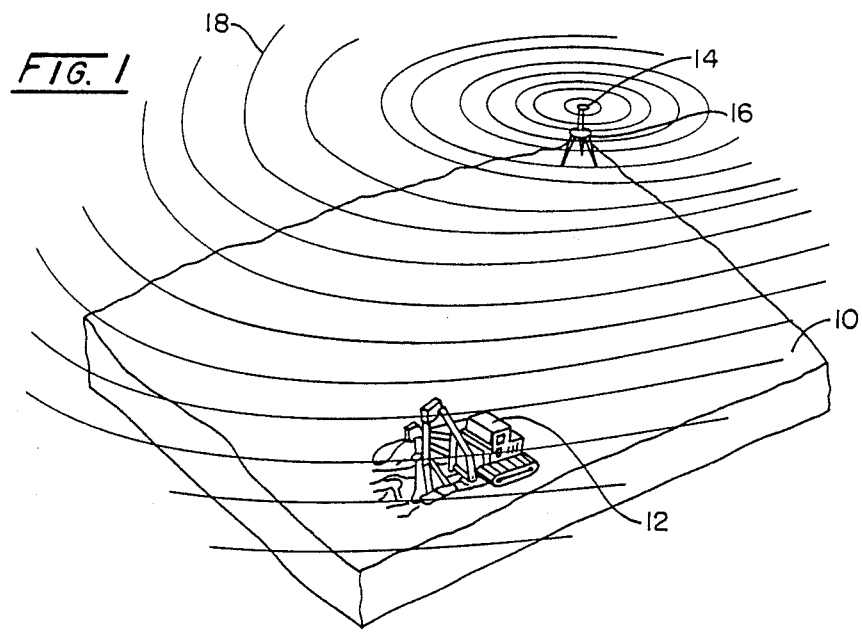
FIG. 1 is a view in perspective of a construction or agricultural site at which an embodiment of the invention is installed.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

FIG. 1 illustrates an agricultural site or field 10 upon which is positioned a remote object such as a trencher 12. A laser light beam radiator 14 is mounted upon a transit tripod 16 at a selected reference point on the geographical field 10. The light radiator 14 periodically scans the laser light beam through a circular path in a generally horizontal plane 18 above the surface of the field 10.

Figure 2:
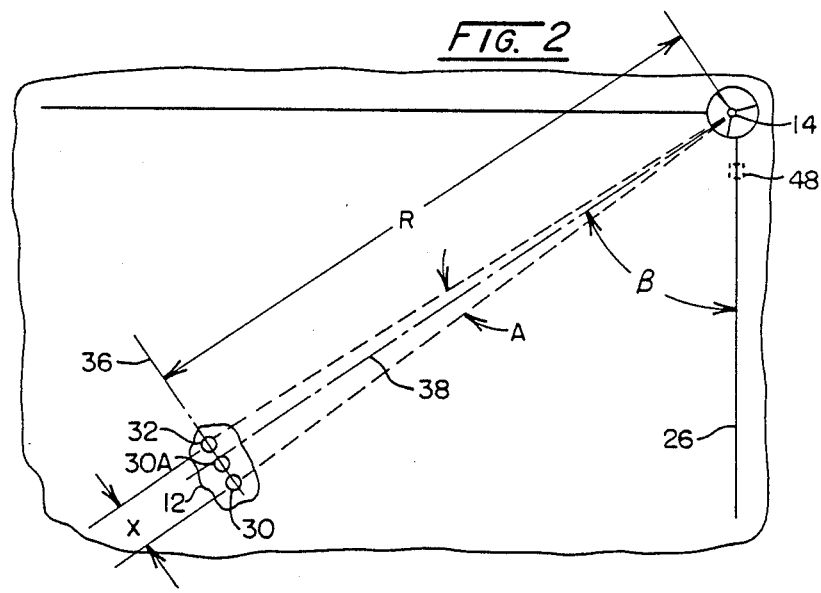
FIG. 2 is a diagrammatic, top, plan view of the embodiment of FIG. 1.
Figure 3:
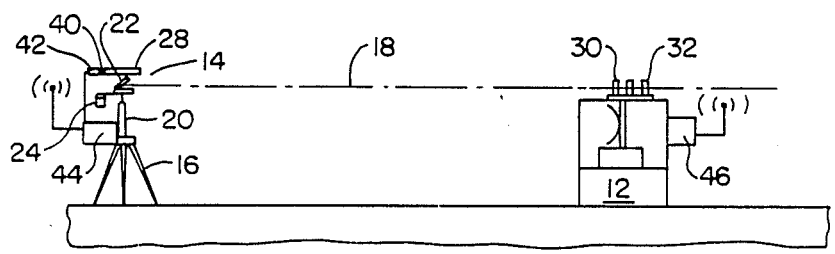
FIG. 3 is a view in side elevation of the embodiment of FIG. 2.

As illustrated in more detail in FIG. 3, the radiator 14 comprises a vertically oriented laser 20 directing its beam vertically upwardly against a mirror 22 which is rotatably mounted above the laser 20 and is driven in rotation by a drive motor 24. Thus, the beam rotates at an angular displacement with respect to a reference radial 26, shown in FIG. 2, which is a function of time. Preferably, the mirror 22 rotates at a constant angular velocity so that the angular displacement of the scanning beam is a linear function of time. It is desirable to maintain a stable, constant velocity. This may be accomplished with a flywheel 28 mounted to the mirror to rotate with it or with other means.

Figure 6:
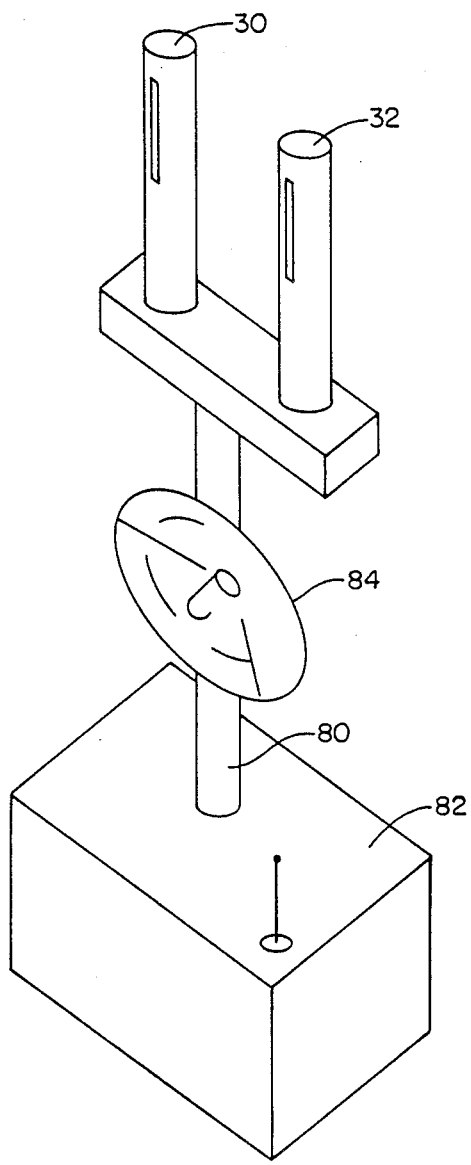
FIG. 6 is a view in perspective of a detector and aiming means embodying the present invention.

Referring to FIGS. 2, 3, and 6 simultaneously, a pair of detectors 30 and 32 are spaced by a selected and known distance and are mounted to the remote object 12. The two detectors 30 and 32 are positioned in the plane 18 of the scanning beam and detect the time of incidence of the scanning beam upon each detector. The detectors are common, conventionally available photo detectors. They are mounted on a common axis 36 which has a known and preferably 90° angle to a radial 38 which intersects that axis at the remote object.

From FIGS. 1–can be seen that the angle B, which is the displacement of the beam from the reference radial 26 to the remote object 12 in degrees, may be computed in accordance with the formula:

$$B = \frac{\Delta T3}{\Delta T2} * 360 \qquad 1.$$

where:
$\Delta T2$ is the time for one complete revolution of the radiating beam; and
$\Delta T3$ is the time for the beam to rotate from the reference radial 26 to one of the detectors 30 or 32 upon the remote object.

The distance R, in feet, from the radiator 14 at the reference point to the detectors 30 and 32 of the remote object 12 may be computed using the following formula:

$$R = \frac{\Delta T2 * x}{\Delta T1 * 24\pi} \qquad 2.$$

where:
$\Delta T1$ is the time for the beam to pass from intercepting the detector 30 to intercepting the detector 32; and
$x$ = the spacing, in inches, between the detectors 30 and 32.

In order to determine the time for a complete revolution of the beam and to mark the instant at which the beam lies along the reference radial 26, a synchronization means is provided. The synchronization means preferably is a small magnet 40 mounted to rotate with the mirror 22 cooperating with a magnetic field detector, such as a Hall effect device 42, which is mounted adjacent the path of the magnet. The Hall effect device 42 generates a pulse in response to passage of the magnet by it. A conventional communication means 44 is also mounted to the tripod 16 for communicating that pulse to the remote object 12. The communication system also includes a receiver 46 mounted to the remote object 12 for receiving and demodulating the synchronization pulse and applying it to computing means on board the remote object 12.

Alternatively, the synchronization means could include a shaft encoder or a photo detector 48 positioned along the reference radial 26 for generating the synchronization pulse and a similar communication system for communicating that signal to the remote object 12.

Figure 4:
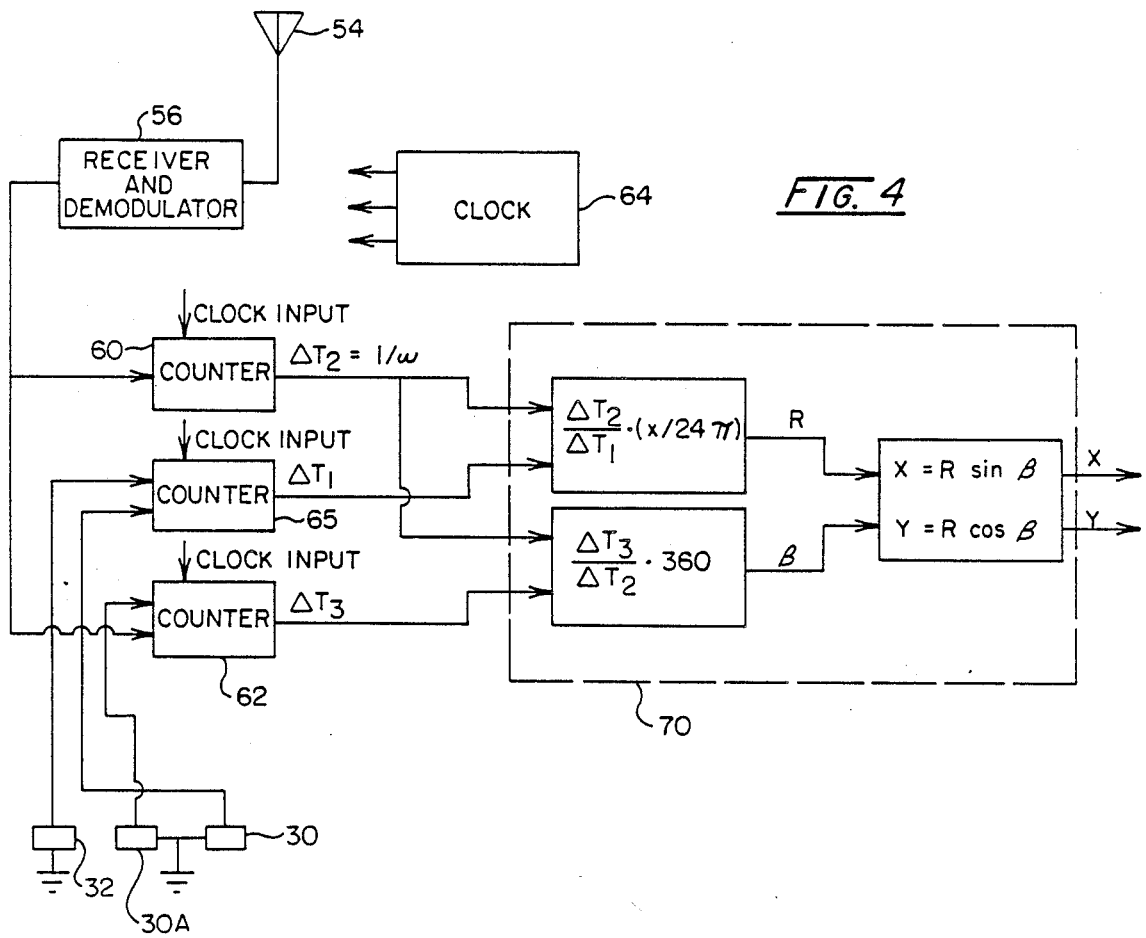
FIG. 4 is a schematic block diagram illustrating the preferred circuitry embodying the present invention.
Figure 5:
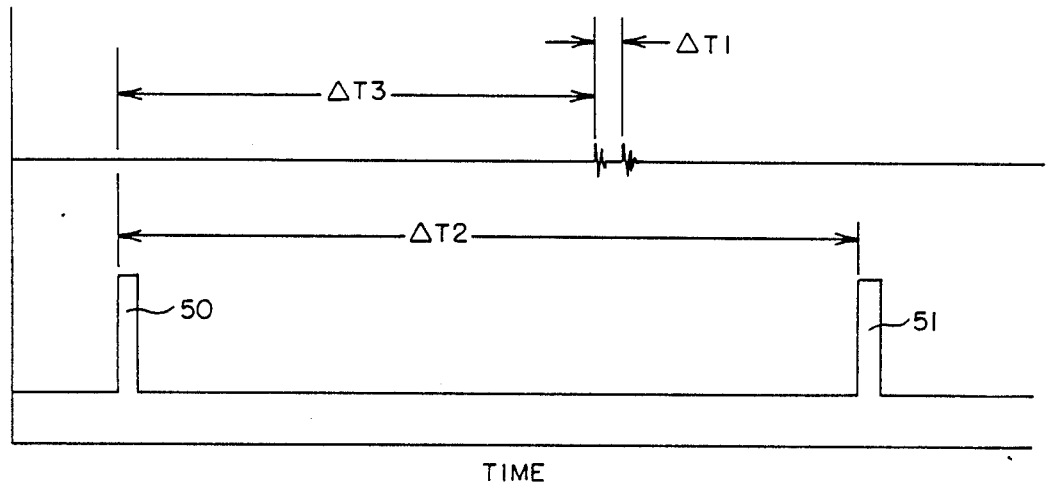
FIG. 5 is an oscillogram illustrating the operation of the preferred embodiment of the invention.

Referring to FIGS. 4 and 5, the synchronization pulses 50 and 51 are separated by the period $\Delta T2$ of the rotating beam and are received at the remote object by an antenna 54. The synchronization pulses are demodulated by the receiver and demodulator 56 and applied to a counter 60 and a counter 62 to initiate the running of the counters 60 and 62 which are connected to a conventional clock 64 and begin counting clock pulses.

Since the synchronization pulse is transmitted when the beam passes or is aligned along the reference radial, the counters 60 and 62 begin counting time at that instant. The time interval $\Delta T3$ which elapses from alignment of the beam along the reference radial until its incidence upon the photo detector 30, is measured when the beam strikes the detector 30 to apply a second pulse to the counter 62. The second pulse stops the counter 62 from counting clock input pulses and therefore provides an output count which is proportional to the time $\Delta T3$.

Detector 32 is connected to one input of a third counter 65. The detector 30A is positioned immediately adjacent the detector 30 and may be eliminated if the detector 30 itself can provide sufficient output power to drive two counters. Thus, detector 30A is equivalent to detector 30 being connected to the other input of the counter 65. Using just the two detectors 30 and 32 is preferred.

The counter 65 determines the time interval $\Delta T1$ by initiating its count of pulses upon the incidence of light on the photo detector 30. Counter 65 stops counting pulses at the incidence of the light beam upon the photo detector 32. As the light beam continues its rotation it again causes the transmission of a second synchronization pulse 51 which like the first pulses is applied to counter 60, but this time stops its counting. Thus, counter 60 has counted the time $\Delta T2$ which is the period of the rotation of the light beam.

The outputs in these counters are then applied in the conventional manner to a microprocessor 70 for converting the time data and the other constants which are stored in the microprocessor to polar coordinates utilizing equations 1 and 2 and, if desired, convert the polar coordinates R and B to conventional Cartesian coordinates x and y.

The axis 36, which is common to the detectors 30 and 32, can be at any substantial, selected, known angle to a radial of the light transmitter 14 which passes through or above the remote object 12. Simple trigonometric relationships are used to modify equations 1 and 2 to accommodate a non-perpendicular angle. Preferably, however, the axis 36 is maintained perpendicularly to the radial 38. To accomplish this it is preferred to use an aiming device utilizing known homing or radio direction finding circuitry.

For example, illustrated in FIG. 6 is the pair of detectors 30 and 32 which are mounted upon a rotatable T support 80 which is motor driven in rotation by an electric motor located within the housing 82 and controlled by a feedback control system. The feedback control system is connected in a conventional manner to a directional antenna 84, itself fixed to and rotating with the T-shaped support 80. The directional antenna signal is fed to the control circuit to cause the antenna to home in upon the carrier transmitted from the communication means 44 mounted to the tripod 16 so that the common axis of the detectors 30 and 32 is always perpendicular to a radial passing between the detectors and the reference point from which the light beam is radiated.

Preferably, the detectors 30 and 32 each comprise detectors of the type utilized by Spectra-Physics in their prior art elevation detector system. This prior art equipment automatically raises and lowers the detectors to maintain them in the plane of the rotating laser beam.

One advantage of the present invention, unlike some other devices, is that it is only necessary to set up and position a single reference light source at the construction or agricultural site and there is no need to measure the distance between two or more such reference devices.

In addition to the applications and uses of an embodiment of the present invention, which are mentioned above, the present invention, when combined with the elevation detection equipment described above, can be mounted on a vehicle and used for rapid survey of a geographical area. The vehicle drives over the geographical area to be surveyed and as it does the system detects and records the elevation and location data for the entire geographical area to provide position and elevation coordinates for each position on the surface.

While certain preferred embodiments of the present invention have been disclosed in detail, it is to be understood that various modifications may be adopted without departing from the spirit of the invention or scope of the following claims.

We claim:

1. An apparatus for detecting the relative position of a remote object upon a geographical field, the apparatus comprising:
    (a) means for radiating a beam of electromagnetic energy from a selected reference point on the geographical field and for periodically scanning the beam through a circular path in a generally horizontal plane above the field, the angular displacement of the scanning beam with respect to a reference radial from the reference point being a function of time;
    (b) at least two detectors which are spaced a selected distance and are mounted to the remote object and positioned in the plane of the scanning beam for detecting the time of incidence of the beam on each detector, the detectors being on a common axis which has a known angle to a radial intersecting the axis;
    (c) means for detecting a first angular displacement of the beam with respect to the reference radial when the beam impinges upon a detector;
    (d) means for detecting a second angular displacement of the beam as it passes between its incidence upon each of the two detectors;
    (e) means for computing the coordinates of the remote object from said first and second angular displacements, said selected distance between the detectors and said axis angle; and
    (f) alignment means for orienting the common detector axis perpendicularly to a radial from the reference point.

2. An apparatus in accordance with claim 1 wherein the radiating and scanning means further comprises means for radiating a light beam and for rotating the beam at a constant angular velocity.

3. An apparatus in accordance with claim 2 further comprising:
    (a) synchronization means for transmitting a signal to the remote object upon each instance of coincidence of the scanning beam along the reference radial; and
    (b) means for detecting the elapsed time interval between said reference radial coincidence signal and incidence of the beam upon at least one of the detectors.

4. An apparatus in accordance with claim 3 wherein said synchronization means comprises a magnet drivingly linked to and mounted for rotation with the beam, a magnetic field detector mounted adjacent the path of the magnet for generation of a pulse in response to passage of the magnet and communication means for communicating the pulse to the remote object.

5. An apparatus in accordance with claim 3 wherein said synchronization means comprises a photo detector positioned along the reference radial and communication means connected to the photo detector for communicating a pulse from the photo detector to the remote object.

6. An apparatus in accordance with claim 1 or 2 or 3 or 4 or 5 wherein the means for detecting said first angular displacement and the means for detecting said second angular displacement include three electronic time lapse counters, the first counter being connected to one of the detectors mounted to the remote object to initiate its timing operation upon incidence of the beam upon that detector and the second and third counters being connected to receive said synchronization signal to begin timing operation upon receipt of said signal, the first counter also being connected to the other detector to stop its timing cycle upon incidence of the beam upon that detector, the second counter also being connected to one of the detectors to stop its timing cycle upon incidence of the beam upon that detector and the third counter being connected to also stop its timing cycle upon the next occurrence of the synchronization signal.

7. An apparatus in accordance with claim 1 wherein the alignment means comprises a drive means for moving at least one of the detectors along an arcuate path, a directional receiving antenna mounted for pivotal motion with the movable detector, transmitting means for radiating an electromagnetic signal from the reference point and a control circuit means for the directional antenna to maintain a line perpendicular to the common axis pointed in the direction of the reference point.

8. A method for detecting the relative position of a remote location upon a geographical field, the method comprising:
    (a) radiating and scanning a beam of electromagnetic energy from a selected reference point on the field in a generally horizontal plane above the field, the beam having an angular displacement with respect to a reference radial from the reference point which is a selected function of time;
(b) detecting the incidence of the scanning beam at each of two spaced positions above the remote location, the two spaced positions having a common axis which are maintained perpendicular to a radial of the reference point through the common axis; and
(c) computing the coordinates of said remote location from:
  (i) the angular displacement of the beam from the reference radial to one of the spaced positions;
  (ii) the angle between the beam and a common axis joining said two spaced positions at the time of the beam's said incidence upon at least one of the spaced positions;
  (iii) the angular displacement of the beam between the two spaced positions; and
  (iv) the distance between said two spaced positions.

9. A method in accordance with claim 8 wherein the beam is a light beam rotated at a constant velocity and wherein said angular beam displacements are detected by measuring the time for the beam to make said displacements and multiplying the times by said constant angular velocity.

* * * * *